J. BAUGHMAN.
Belt-Tightener.

No. 224,378.  Patented Feb. 10, 1880.

WITNESSES:
C. Neveux
C. Sedgwick

INVENTOR:
J. Baughman
BY Munn & Co.
ATTORNEYS.

UNITED STATES PATENT OFFICE.

JOHN BAUGHMAN, OF INDIANAPOLIS, INDIANA.

BELT-TIGHTENER.

SPECIFICATION forming part of Letters Patent No. 224,378, dated February 10, 1880.

Application filed August 25, 1879.

*To all whom it may concern:*

Be it known that I, JOHN BAUGHMAN, of Indianapolis, in the county of Marion and State of Indiana, have invented a new and Improved Belt-Tightener, of which the following is a specification.

My improvements relate to devices for tightening belts and drawing the ends together for lacing or riveting.

The invention consists in connecting a tightener with the belt by wedge-shaped cross-bars, so that the tightener may be separated from belt by the blow of a hammer, and all screws, stirrups, &c., dispensed with.

The construction and operation will be more particularly described with reference to the accompanying drawings, and the invention pointed out in the claim.

Figure 1:
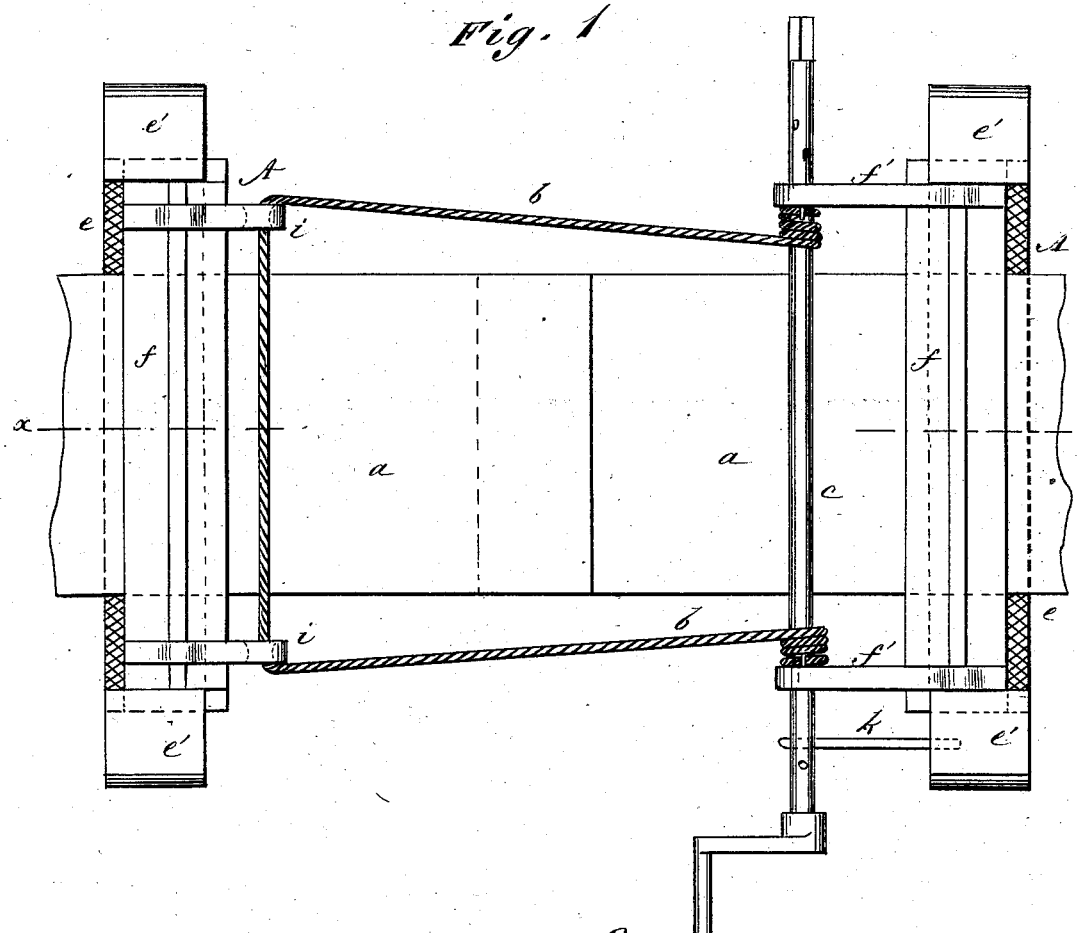
Figure 2:
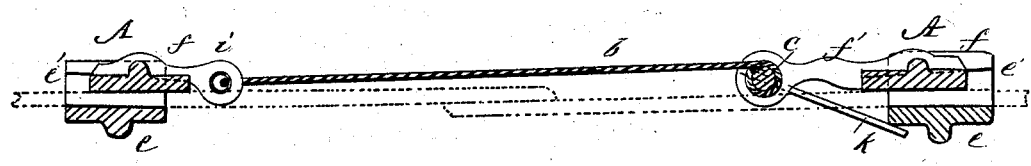

In the drawings, Figure 1 is a plan view of the tightener as applied to use. Fig. 2 is a longitudinal section on line $x\ x$.

Similar letters of reference indicate corresponding parts.

A A are the clamps, which are shown as attached upon the ends $a\ a$ of a belt and connected together by the rope $b$, that passes from the windlass-barrel $c$ on one clamp through eyes on the other. Each clamp A consists of two plates, $e\ f$, one of which, $e$, is formed with raised lugs $e'$ at each end, that are slotted or grooved to receive the ends of plate $f$, the ends of $f$ and the grooves of lugs $e'$ being inclined, so that the belt placed between plates $e\ f$ will be clamped by movement of plate $f$ in one direction or freed by a reverse movement.

Upon the plate $f$ of one clamp A there are formed or attached arms $f'$, which carry shaft or windlass-barrel $c$, that is fitted at its end with a crank-handle, and to which the ends of rope or chain $b$ are attached. This rope $b$ passes through eyes in arms or lugs $i$, that project from the plate $f$ of the other clamp A.

In operation the clamps A will be placed upon the adjoining ends of the belt, as illustrated by the drawings, and the belt clamped by giving to the plates $f$ a slight tap with a hammer. The parts may then be put under strain and the belt drawn tight by means of the windlass and rope, the draft on the plates $f$ being in the direction for clamping them upon the belt. In the ends of shaft $c$ are holes for receiving a pin, $k$, to hold the shaft from turning back. This pin is to be inserted when the belt is tightened sufficiently, and retains the shaft by contact with the end of plate $e$.

This tightening apparatus may be readily and quickly applied or removed, and the same tightener may be applied to a belt of the full width or to a narrow belt. In case the clamps are not placed straight upon the belt the rope will give and the ends of the belt be brought together evenly.

Having thus fully described my invention, I claim as new and desire to secure by Letters Patent—

The clamps A, consisting of the plates $e$, provided with raised lugs $e'$, having inclined grooves, and the plates $f$, provided with the arms $f'$ and the lugs $i$, and having their ends beveled or inclined in an opposite direction to the inclined grooves of the said lugs, in combination with the rope $b$ and the windlass $c$, provided with holes in its ends for the reception of the pin $k$, substantially as and for the purpose set forth.

JOHN BAUGHMAN.

Witnesses:
   GEO. W. LYNN,
   GEO. A. EMERSON.